United States Patent
Moutafis et al.

(10) Patent No.: US 11,898,926 B2
(45) Date of Patent: Feb. 13, 2024

(54) INSPECTION APPARATUS AND METHODS FOR PRECISION VIBRATION-ISOLATION TABLETOPS

(71) Applicant: Technical Manufacturing Corporation, Peabody, MA (US)

(72) Inventors: Alexander B. V. Moutafis, Salem, MA (US); Luc Owens Robitaille, Ipswich, MA (US)

(73) Assignee: Technical Manufacturing Corporation, Peabody, MA (US)

( * ) Notice: Subject to any disclaimer, the term of this patent is extended or adjusted under 35 U.S.C. 154(b) by 429 days.

(21) Appl. No.: 17/018,136

(22) Filed: Sep. 11, 2020

(65) Prior Publication Data

US 2021/0080348 A1 Mar. 18, 2021

Related U.S. Application Data

(60) Provisional application No. 62/900,397, filed on Sep. 13, 2019.

(51) Int. Cl.
*G01M 11/04* (2006.01)
*A47B 13/08* (2006.01)
*G01B 11/02* (2006.01)

(52) U.S. Cl.
CPC ............. *G01M 11/04* (2013.01); *A47B 13/08* (2013.01); *G01B 11/02* (2013.01)

(58) Field of Classification Search
CPC .......... G01M 7/08; G01M 7/00; G01M 11/04; G01N 29/045; G01B 11/306; G01B 11/02;

(Continued)

(56) References Cited

U.S. PATENT DOCUMENTS 4,360,184 A 11/1982 Reid, III
6,486,963 B1 * 11/2002 Holec .................... G01B 11/24
356/601

(Continued)

FOREIGN PATENT DOCUMENTS

CN 204142684 U 2/2015
CN 108254440 A 7/2018

(Continued)

OTHER PUBLICATIONS

Kobayashi et al. "Inspection Method for Bolt Looseness and Inspection Device Therefor", Oct. 22, 1996, JP H08278116A (Year: 1996).*

(Continued)

*Primary Examiner* — Sang H Nguyen
(74) *Attorney, Agent, or Firm* — Smith Baluch LLP

(57) ABSTRACT

Apparatus and methods to automatically inspect precision tabletops used for vibration isolation are described. An inspection head having an imaging device and/or perturbing device can be positioned automatically at a plurality of locations over a precision tabletop. The inspection head can further include a distance sensor that can be used to determine a flatness of a portion or all of a surface of the precision tabletop. The inspection head may further include marking apparatus to automatically mark non-compliant features formed on the precision tabletop.

23 Claims, 6 Drawing Sheets

(58) Field of Classification Search
CPC ..... G01B 11/24; G01B 11/0608; A47B 13/08; A47B 96/18; F16F 15/02; F16F 15/022
See application file for complete search history.

(56) References Cited

U.S. PATENT DOCUMENTS

| | | | |
|---|---|---|---|
| 2004/0086165 | A1 | 5/2004 | Yu et al. |
| 2011/0103548 | A1* | 5/2011 | Bendahan ............ G01N 23/203 378/57 |
| 2013/0328253 | A1* | 12/2013 | Kraner ................. F16F 15/002 267/140.14 |
| 2016/0091047 | A1* | 3/2016 | Kramer ................. F16F 7/1011 267/140.14 |
| 2018/0313422 | A1* | 11/2018 | Ryan ....................... F16F 7/121 |

FOREIGN PATENT DOCUMENTS

| | | |
|---|---|---|
| CN | 208921661 U | 5/2019 |
| EP | 3267189 A4 | 11/2018 |
| GB | 2361311 A | 10/2001 |
| JP | H1164305 A | 3/1999 |
| JP | 2001305113 A | 10/2001 |
| JP | 2002333437 A | 11/2002 |
| JP | 2003014711 A | 1/2003 |
| KR | 101739075 B1 | 5/2017 |

OTHER PUBLICATIONS

Ishii Toru "Positioning Device and Punching Device", Dec. 7, 2017, JP 2017213667A (Year: 2017).*
Masataka et al "Method and Device for Inspecting Defect", Aug. 10, 2006, JP 2006208258A (Year: 2006).*
Nakamura Tatsuya "Vibration Isolating Stand and Substrate Inspection Equipment", Jul. 23, 2015, JP 2015132337A (Year: 2015).*
Search Report in United Kingdom Patent Application No. GB2014351.7 dated Jan. 26, 2021, 5 pages.
Examination Report in United Kingdom Patent Application No. GB2014351.7 dated Mar. 9, 2023, 4 pages.
Office Action with machine translation in French Application No. 20/09233 dated May 11, 2023, 4 pages.
Search Report with machine translation in French Application No. 20/09233 dated Jun. 14, 2021, 20 pages.

* cited by examiner

INSPECTION APPARATUS AND METHODS FOR PRECISION VIBRATION-ISOLATION TABLETOPS

CROSS-REFERENCE TO RELATED APPLICATIONS

This application claims priority to U.S. provisional patent application Ser. No. 62/900,397, titled "Inspection Apparatus and Methods for Precision Vibration-Isolation Tabletops," filed Sep. 13, 2019, which application is hereby incorporated by reference in its entirety.

BACKGROUND

Technical Field

The technology relates to apparatus and methods for inspecting tabletops that are used in precision vibration-isolation applications.

Discussion of the Related Art

Precision instruments that are used in various areas of technology (e.g., integrated circuit fabrication, metrology, sample inspection, various areas of microscopy, precision medical instruments etc.) benefit from isolation of ambient sources of noise that can couple unwanted motion (e.g., vibrations, impulses, etc.) into a precision instrument. One approach to vibration isolation is to mount an instrument on a vibration-isolation tabletop that has passive motion dampers (e.g., an air-suspension and/or spring-suspension system with motion-damping components such as passive dampers with viscous fluid or material). In some cases, a precision instrument may need vibration isolation from external sources to levels where passive motion dampers do not provide enough vibration isolation. To achieve such performance, an active vibration-isolation system may be employed between a precision instrument and a base which supports the instrument and vibration-isolation system. For example, an active feedback system may be used to drive actuators in the vibration-isolation system to oppose externally-induced motion of the precision instrument.

SUMMARY

Apparatus and methods for automatically inspecting precision vibration-isolation tabletops are described. As may be appreciated, the quality of a precision vibration-isolation tabletop can affect the overall performance of an active or passive vibration isolation system. According to some embodiments, an inspection apparatus for a vibration-isolation tabletop includes at least one moveable inspection head that is configured to automatically inspect one or more physical characteristics of the tabletop. Characteristics inspected include, but are not limited to, flatness of the tabletop (for both local and global regions), location and quality of mounting features in the tabletop, and vibration-damping and stiffness characteristics of the tabletop at one or more locations. Tests can be performed automatically by a computerized controller that operates the one or more inspection heads. In some embodiments, the controller can obtain information from a computer-aided design (CAD) file or other file storing information about the tabletop. The CAD file or other file can contain design information for the tabletop.

Some embodiments relate to vibration-isolation inspection systems. Such systems may comprise an inspection head having an imaging array and a perturbing device that imparts mechanical energy to vibration-isolation equipment, such as a precision tabletop under test, and a system controller configured to control motion of the inspection head.

Some embodiments relate to methods of inspecting a precision tabletop. Such methods can include acts of: automatically positioning an inspection head at a first location over a precision tabletop; obtaining an image of a portion of a surface of the precision tabletop; automatically imparting an impulse to the surface with an impact hammer; and receiving sensor information indicating an effect of the impulse on the surface.

Additional embodiments of methods can include acts of: automatically positioning an inspection head at a plurality of locations over a precision tabletop; obtaining information about physical characteristics of the precision tabletop at the plurality of locations; and providing the information to a user of the precision tabletop.

The foregoing summary is provided by way of illustration and is not intended to be limiting. The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

The skilled artisan will understand that the figures, described herein, are for illustration purposes only. It is to be understood that in some instances various aspects of the embodiments may be shown exaggerated or enlarged to facilitate an understanding of the embodiments. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

Aspects, embodiments, and features of the present teachings can be more fully understood from the following description in conjunction with the accompanying drawings.

DETAILED DESCRIPTION

The scientific research communities and the microfabrication, medical, nanotechnology, optics, and semiconductor industries continue to develop challenging demands for noise-free environments for precision instruments used in research and commercial settings. Sources of noise can include energy sources that cause unwanted vibrations in a precision instrument and/or magnetic and electromagnetic fields that cause unwanted magnetic fields in a precision instrument. Vibration isolation typically requires suppression of dynamic forces (typically from external sources) that would otherwise act upon and perturb (vibrate) a precision instrument producing unwanted motion and impairing its performance. To obtain proper operation and improved performance of some precision instruments, it may be necessary to reduce unwanted motion of an instrument to the sub-micron or even sub-100-nm level.

Figure 1:
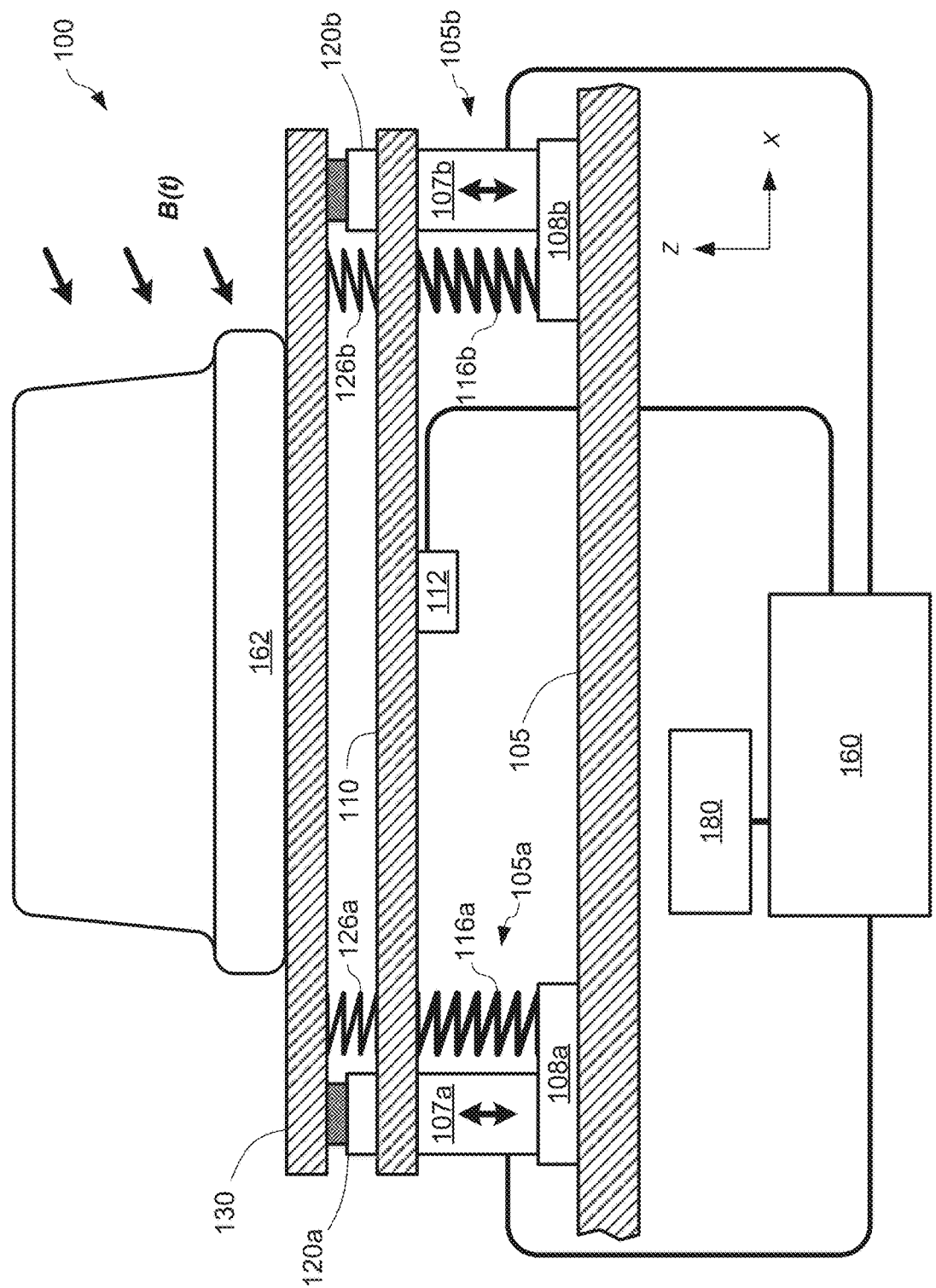
FIG. 1 depicts an example of an instrument supported by a precision vibration-isolation tabletop that is part of an active vibration-isolation system, according to some embodiments.

One example of a vibration-isolation system 100 is illustrated in FIG. 1. The system 100 may support a payload 162 (such as a precision instrument) that may be subjected to unwanted external forces that can cause unwanted motion (such as vibrations) of the payload. The illustration is a simplified diagram of an active vibration-isolation system 100 that employs a feedback loop to suppress unwanted motion of the payload 162, according to some embodiments. Although only one example of a vibration-isolation system is illustrated and described in detail, other types of vibration-isolation systems can be used in combination with inspection apparatus of the present invention. Other types of vibration-isolation systems include, but are not limited to, an active vibration-isolation system that employs feedback and feedforward control as described in International application No. PCT/US2018/000146, titled "Precision Vibration-Isolation System with Floor Feedforward Assistance" and filed on Aug. 15, 2018, which is incorporated herein by reference. Other types of vibration-isolation systems include, but are not limited to, active vibration-isolation systems in which one or more actuators used to suppress unwanted motion of the payload carry a majority of weight of the payload, such as the vibration-isolation system described in U.S. Pat. No. 5,823,307, titled "Stiff Actuator Active Vibration Isolation System" and filed on May 2, 1997, which is incorporated herein by reference. Other types of vibration-isolation systems also include passive vibration-isolation systems mentioned above.

In some embodiments and referring again to FIG. 1, an active vibration-isolation system 100 can comprise an intermediate mass 110 that is supported above a base 105 by plural isolation assemblies 105a, 105b. The isolation assemblies may essentially float the intermediate mass 110 and apparatus mounted on the intermediate mass. One or more motion sensors 112 can be mounted on the intermediate mass to sense motion of the intermediate mass in one or more directions (e.g., in the z direction for the embodiment depicted in FIG. 1, though x and y directions may be sensed with additional sensors in other embodiments). In some cases, a single multi-axis sensor (e.g., a multi-axis geophone or accelerometer) can sense motion of the intermediate mass in two or more directions. Output from the motion sensor(s) can be provided to control circuit 160 that processes the signal(s) and provides drive signals to actuators 107a, 107b in the isolation assemblies 105a, 105b to oppose and reduce sensed motion. The actuators 107a, 107b can be arranged to drive the intermediate mass 110 relative to the base 105. Such feedback control operates to reduce unwanted motion of the intermediate mass 110. An active vibration-isolation system 100 can further include support structure (e.g., a payload support which may be a precision vibration-isolation tabletop 130) with passive vibration isolation (e.g., dampers 120a, 120b, and springs 126a, 126b) located above the intermediate mass that supports a payload 162. In some cases, the payload 162 can be a precision instrument, examples of which are given above. In some embodiments, the precision tabletop 130 can be a single slab of material with mounting features formed therein. In some implementations, the precision tabletop 130 can be an engineered structure, such as that described in connection with FIG. 2A or FIG. 2B.

Although only two isolation assemblies 105a, 105b are shown in the drawing of FIG. 1, an active vibration-isolation system 100 can include three or more isolation assemblies arranged between an intermediate mass 110 and the base 105. In some embodiments, there can be isolation assemblies configured to provide vibration isolation in multiple directions (e.g., in the x and/or y directions and arranged between the intermediate mass 110 and side walls or posts extending up from the base 105), and not only the z direction as depicted in FIG. 1.

In some cases, the isolation assemblies can be configured to provide isolation against perturbations that would otherwise affect pitch, roll, and/or yaw of the intermediate mass 110. For example, two or three motion sensors places at different locations on the intermediate mass 110 can detect pitch, roll, and/or yaw of the intermediate mass 110 and produce feedback signals that can be processed by the control circuit 160 to drive actuators to cancel the detected pitch, roll, and/or yaw. As just an example of roll, a first sensor near a first isolation assembly 105a may detect a different z motion of the intermediate mass 110 than is detected by a second sensor near a second isolation assembly 105b. In response to the differences in detected z motion (indicating roll of the intermediate mass 110), the control circuit can drive a first actuator 107a differently than a second actuator 107b to cancel the roll.

In some embodiments, vibration-isolation assemblies can include offload springs and actuators. For example, a first isolation assembly 105a can comprise an offload spring 116a and actuator 107a. In some implementations, the offload springs 116a, 116b can have a greater stiffness than the actuators 107a, 107b, such that the offload springs carry most or all of the weight of the payload 162, intermediate mass 110, and supporting structure above the intermediate mass 110. In some cases, the offload springs 116a, 116b can be variable-rate springs to accommodate a range of payload weights and exhibit a stiffness greater than the actuators. Examples of systems in which the offload springs have greater stiffness than the actuators are described in U.S. Pat. Nos. 8,899,393 and 9,353,824 which are incorporated herein by reference in their entirety. In such implementations, the actuator can comprise a soft actuator such as a voice coil driver.

In some embodiments, the offload springs 116a, 116b may not be present or can have a stiffness less than the actuators 107a, 107b, such that the actuators carry most or all of the weight of the payload 162, intermediate mass 110, and supporting structure above the intermediate mass 110. Examples of systems in which the offload springs have less stiffness than the actuators are described in U.S. Pat. No. 5,660,255 which is incorporated herein by reference in its entirety. In such implementations, the actuator can comprise a stiff actuator such as a piezoelectric actuator.

The intermediate mass 110 can be formed from any suitable material, such as aluminum, stainless steel, or a combination thereof, though other materials can be used in some embodiments. Although FIG. 1 shows one intermediate mass 110 that spans plural isolation assemblies 105a, 105b, in some cases each isolation assembly can have its own intermediate mass which is not connected to the intermediate mass of all other isolation assemblies. In such cases, one or more motion sensors 112 can be mounted on each isolation assembly's intermediate mass to sense motion in one or more directions. Each isolation assembly can support separated regions of a payload 162. For example, each isolation assembly can support a portion of the precision tabletop 130. In some cases, each isolation assembly can be controlled by a same feedback loop for a given direction, such that the isolation assemblies operate in parallel from a common actuator drive signal. In some cases, each isolation assembly can be controlled by different feedback loops for a given direction, such that the isolation assemblies operate in parallel from different actuator drive signals. When each isolation assembly is controlled by a different feedback loop and the isolation assemblies are separated, cancellation of pitch, roll, and/or yaw can occur automatically and need not be separately sensed and accounted for.

The base 105 can comprise any suitable material, such as aluminum, stainless steel, or a combination thereof, though other materials can be used. In some implementations, the base 105 can comprise a floor, table or other structure located at a facility, and may not be included as part of a manufactured vibration-isolation system 100. In such implementations, an isolation assembly 105a can be provided as a separately packaged assembly that is configured to mount between the payload 162 and base 105.

According to some implementations, level adjusters 108a, 108b can be included with an isolation assembly to adjust the levelness of the intermediate mass 110 and/or the payload 162. A level adjuster 108a, for example, can comprise a threaded drive assembly that is coupled to an actuator 107a and can be rotated (manually and/or automatically) to adjust a height of an actuator 107a, 107b above a base 105. In some cases, a level adjuster can further adjust the height of an offload spring 116a above the base 105.

According to some embodiments, a motion sensor 112 can comprise an accelerometer or geophone, for example, and can output at least one signal representative of motion in one direction (e.g., the z direction) to a computerized control circuit 160. Other types of motion sensors (e.g., strain-gauge sensors, microelectromechanical sensors, gyrometers, optical interferometric sensors, etc.) can also be used, and the invention is not limited to only accelerometers and geophones. In multi-axis vibration-isolation systems, one or more motion sensors 112 can output motion signals representative of motion in two or more directions (for example, any combination of x, y, z, pitch, roll, and yaw). Control circuit 160 can be configured to process signals from the motion sensor(s) 112 and output drive signals to the actuators 107a, 107b that drive the intermediate mass 110 in a manner to oppose motion sensed by the motion sensor. Some examples of feedback control that may be included in control circuit 160 are described in connection with FIGS. 1, 2, 4, 18, 19, and 22 in U.S. Pat. No. 5,823,307 and in connection with FIG. 4 in U.S. Pat. No. 7,726,452, both of which are incorporated herein by reference. The control circuit 160 can include passive, active, analog, and/or digital circuit components, and can include processing electronics (e.g., logic components, a microcontroller, a microprocessor, a field-programmable gate array, an application-specific integrated circuit, a digital signal processor, or some combination thereof) adapted to perform feedback cancellation of unwanted motion as described herein and in the sections of the aforementioned U.S. patents.

A user interface 180 can be in communication with the control circuit 160, according to some embodiments, and can be configured to receive user input and indicate a stability of operation of the vibration-isolation system 100, according to some embodiments. A user interface can comprise a touch screen, a touch panel, a graphical user interface, mechanical knobs, buttons, toggles, or switches, indicator lights, an imaging display, or some combination of these devices. In some implementations, a user interface 180 comprises a personal computer or smartphone that communicates with control circuit 160 through a wireless or wired communication link. A custom software application can be executing on the personal computer or smartphone that allows communication with and reconfiguration of software elements executing on processing electronics of control circuit 160.

According to some embodiments, a precision tabletop 130 can be supported over the intermediate mass 110 by additional support springs 126a, 126b. Also, dampers 120a, 120b can be added between the precision tabletop 130 and the intermediate mass 110 to dampen motion of the precision tabletop 130. In some embodiments, there can be three or more sets of support springs 126a, 126b and dampers 120a, 120b. In some cases, level adjusters 108a, 108b can be included between the precision tabletop 130 and the intermediate mass 110 for levelling the precision tabletop 130 and/or payload 162. In some implementations, the payload 162 can be mounted directly on a single precision tabletop 130 that spans plural support springs 126a, 126b and dampers 120a, 120b as shown. In other implementations, the precision tabletop 130 may not span plural support springs and dampers. Instead, separate precision tabletops can be located at each support spring and damper and support a portion of the payload 162. In some cases, the support springs 126a, 126b and dampers 120a, 120b can connect directly to separated locations on the payload 162 and a payload support or payload support plates may not be used.

Figure 2A:
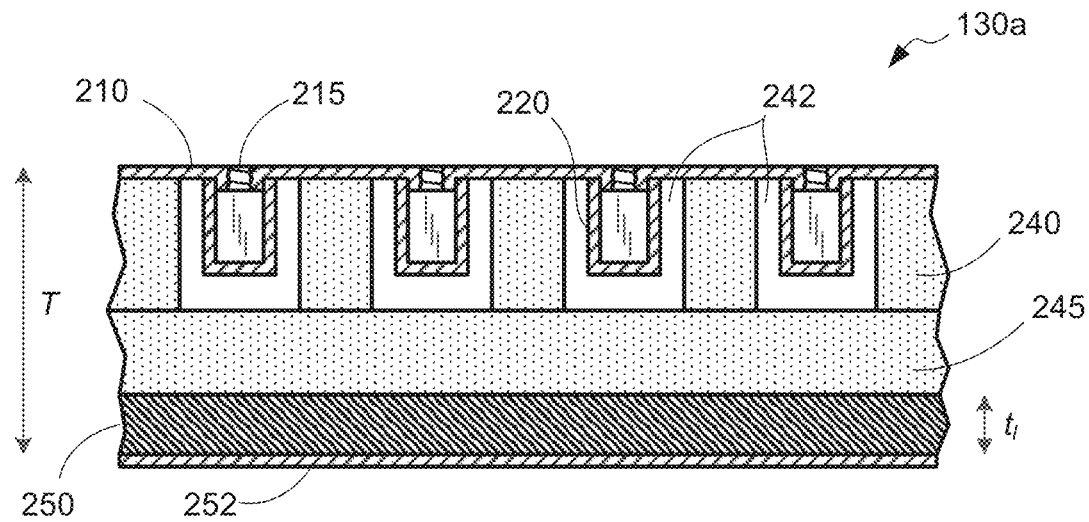
FIG. 2A depicts an example of a precision vibration-isolation tabletop, according to some embodiments.

FIG. 2A depicts one example portion of a precision tabletop 130a that can be used in a vibration-isolation system. Additional examples of precision tabletops 130 that may be inspected with the apparatus of the present invention can be found in international application No. PCT/US2016/033046, titled "Laminated, Low-Profile, Vibration-Damped Tabletop," filed May 18, 2016, which is incorporated herein by reference. Although a precision tabletop 130 may be used in a vibration-isolation system such as that depicted in FIG. 1, a precision tabletop can be used in other vibration-isolation systems, such as purely passive vibration-isolation systems. In some cases, a precision tabletop 130 can be supported by three or more passive vibration-damping assemblies that float the tabletop 130 using pneumatic cylinders.

According to some embodiments, a precision tabletop 130a can be a multi-layer structure that is assembled together to form the tabletop. The precision tabletop (also referred to as a "tabletop") may comprise a top skin 210 that is perforated with one or a plurality of holes 215. The holes may be threaded, according to some embodiments. A plurality of cups 220 may be sealed to the top skin 210 toward a backside of the holes 215. The cups can protect against liquids from spills on the tabletop that would otherwise flow to the interior of the tabletop and potentially cause damage to the interior structure over time. In some embodiments, a manufactured homogeneous material 240 may be bonded to the top skin. The manufactured homogeneous material 240 may be included within the tabletop and have one or a plurality of voids 242 that accommodate the cups 220 within the interior of the tabletop 130a. In some embodiments, a plurality of cups 220 can be formed in a continuous sheet that is bonded to the top skin 210, so as to back the plurality of holes 215.

According to some embodiments, there may be a second homogeneous material 245 that is bonded to the first homogeneous material 240. In some implementations, there may not be a second homogeneous material 245. The tabletop may further comprise a base plate 250 that may be bonded to the laminated structure. The base plate can be metallic in some implementations. In some cases, there may be a bottom skin 252 that is bonded to the base plate, though other embodiments may not include a bottom skin. The resulting structure can form a laminated, vibration-damping tabletop. An overall thickness T of the tabletop 200 can be between approximately 1.5 inches in some embodiments and approximately 2 feet in other embodiments, and will generally depend upon the size and weight of the payload that is to be supported by the tabletop 130a.

In further detail, the base plate 250 may be made of any metal or metal alloy, and may be steel or stainless steel. In some embodiments, a thickness $t_l$ of the base plate 250 can be selected, depending on the size of the tabletop, so that the weight of the tabletop is at least 150 pounds in some embodiments, or may be at least 200 pounds in some embodiments for any areal size between approximately 1.5 feet by 1.5 feet and approximately 4 feet by 5 feet while the thickness of the tabletop is between 1.5 and 2.5 inches. In some implementations, a thickness $t_l$ of the base plate 250 can be selected to provide a weight loading on each vibration-isolation support for the tabletop that is at least 35 pounds in some embodiments, or at least 50 pounds in some embodiments, for any areal size of the tabletop between approximately 1.5 feet by 1.5 feet and approximately 4 feet by 5 feet while the thickness of the tabletop is between 1.5 and 2.5 inches. As an example, the base plate 250 may be thicker for a tabletop measuring 2 feet by 3 feet than for a tabletop measuring 3 feet by 4 feet. The thickness of the base plate 250 may be between approximately 0.125 inch and approximately 2 inches, depending on an areal size of the tabletop and a number of vibration-isolation supports used to support the tabletop.

Referring again to FIG. 2A, the top skin 210 may comprise a metal (e.g., stainless steel), according to some embodiments. The thickness of the top skin may be between approximately 0.048 inches and approximately 0.25 inches. According to some embodiments, the holes 215 in the top skin 210 may be formed using any suitable manufacturing process and tapped to thread the holes. In some embodiments, the holes 215 may be formed by an extrusion process that extrudes a region of the top skin around each hole to increase the effective thickness of the top skin at the hole. The extruded hole may then be tapped to thread the extruded portion. The holes may be spaced on a regular array in some embodiments. In other embodiments, there may be few holes formed in the top skin and located at predetermined locations for custom mounting of equipment. In this regard, there may be additional holes in the side walls of a tabletop 130a, bottom skin 252, and/or base plate 250 for custom mounting of equipment.

The cups 220 can be formed of any suitable material that resists corrosion. In some embodiments, the cups can be formed from a metal, such as stainless steel, though other corrosion resistant metals can be used in some cases. In some implementations, the cups 220 can be formed from a polymer, such as a polyethylene or nylon. In some cases, there may be a mix of metal and polymeric cups. In some implementations, the cups may comprise a metal coated with a polymer. The cups 220 can be bonded to the top skin 210 with an adhesive. To reduce the amount of liquid entering a hole from a spill, a volume of the cups may be less than approximately 12 cubic centimeters, for example.

The bottom skin 252 can be formed from any suitable metal or alloy, such as steel or stainless steel, though other metals may be used in some embodiments. In some implementations, the bottom skin can comprise a polymer, epoxy, fiberglass, or other non-metallic coating. A bottom skin can provide corrosion protection for the base plate 250. In various embodiments, the bottom skin 252 may have a thickness between approximately 0.040 inch and approximately 0.080 inch, though larger or smaller thicknesses may be used in some cases. There may be one or more threaded holes (not shown) in the base plate 250 and bottom skin 252 and/or side walls of the tabletop that may be used to fasten components or supporting structure to the tabletop 130a.

Figure 2B:
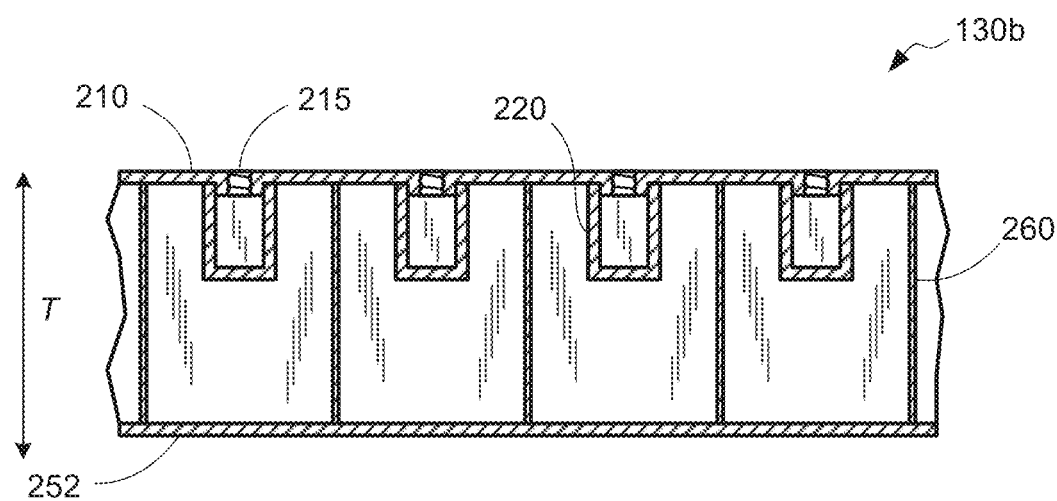
FIG. 2B depicts an example of a precision vibration-isolation tabletop, according to some embodiments.

FIG. 2B depicts another example portion of a precision tabletop 130b that can be inspected with the apparatus of the present invention. The illustrated example depicts a structure referred to as a "honeycomb" tabletop. A honeycomb tabletop can comprise a top skin 210 that can be made of stainless steel. The top skin 210 can include one or an array of threaded holes 215. The holes can be used to fasten scientific equipment securely to the tabletop. The threaded holes can be backed with cups 220, as described above, to prevent contaminants from entering into the tabletop structure. Further details of cups 220 and such tabletop structures are described in U.S. Pat. Nos. 4,645,171 and 5,558,920, which are both incorporated herein by reference.

A honeycomb tabletop 130b may further include a honeycomb filler 260 and lower skin 252. The lower skin 252 can be made of steel or stainless steel. According to some embodiments, the honeycomb filler 260 can comprise a webbing of thin steel walls with large voids between the walls. The honeycomb filler 260 may be an engineered product that provides considerable stiffness to the tabletop, and accommodates the cups 220. In some cases, the threaded holes 215 and cups 220 can be located on a regular grid pattern (e.g., on a square grid with one-inch spacings between the centers of holes in x and y orthogonal directions). For large precision tabletops 130, there can be thousands of threaded holes 215 and/or other mounting features (e.g., pins, unthreaded holes, studs, grooves, slots, etc.) formed in a tabletop 130.

The inventors have recognized and appreciated that precision tabletops 130 can benefit from automated inspection of several physical characteristics of the tabletop before release to a customer. Characteristics that can be inspected automatically include tabletop flatness (local and global), location(s) of mounting feature(s), quality of mounting feature(s), vibration-damping, and stiffness characteristics. Vibration-damping characteristics can indicate how resistant the tabletop is to periodic motion induced from an external periodic force or how quickly a vibration decays once excited in a tabletop at any frequency. A stiffness characteristic can indicate a maximum amount of deflection of a tabletop that is produced in response to a known impulse or other known perturbation. Inspection of these aspects can determine whether a tabletop 130 is suitable for an intended application. Inspection results can be used in some cases to determine whether and where modifications can be made to a tabletop 130 to bring the tabletop into compliance for an intended application. In some cases, mapping stiffness and vibration-damping characteristics for a surface of the tabletop can indicate preferred regions of the tabletop where sensitive equipment can be mounted and would be less susceptible to unwanted motion. The inventors have conceived of inspection head apparatus and an inspection system that can be used to automatically test various physical characteristics of a precision vibration-isolation tabletop as well as mark a tabletop at locations where modifications may be needed.

Figure 3:
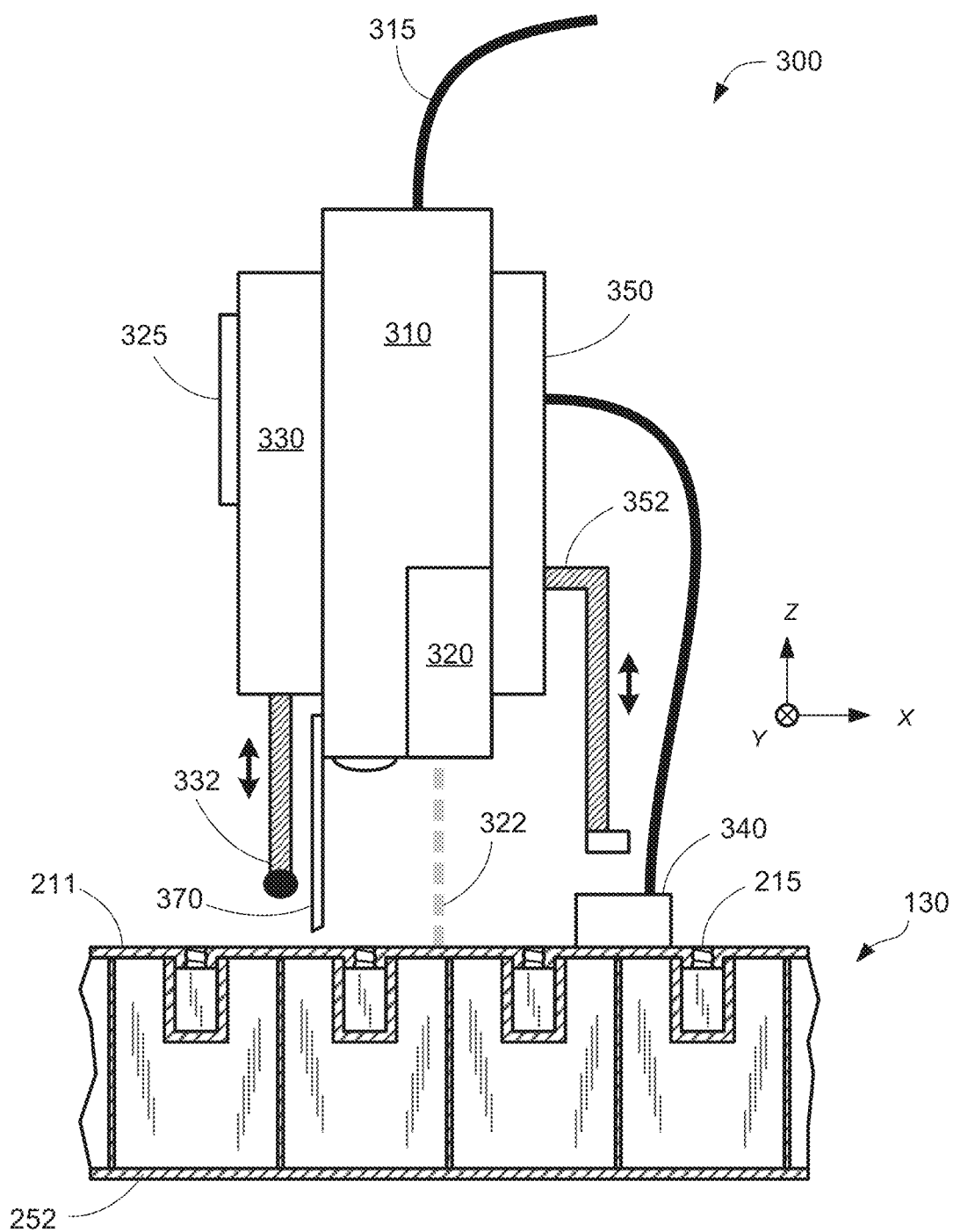
FIG. 3 depicts, in elevation view, an example of an inspection head that can be used to inspect a precision vibration-isolation tabletop, according to some embodiments.

FIG. 3 is a simplified diagram of an inspection head 300 that can be used to inspect precision vibration-isolation tabletops 130, according to some embodiments. In some implementations, an inspection head includes one or some combination of: a camera 310, a distance sensor 320, and a perturbing device 330. In some embodiments, only two of these components can be included in an inspection head 300. In some implementations, all three components can be included in an inspection head 300. The inspection head 300 can be mounted on positioning apparatus that is configured to move the inspection head in at least two or three dimensions (e.g., at least in the x and y directions referenced in the drawing). Though, the positioning apparatus may also be configured to rotate the inspection head about one or more orthogonal axes.

In some implementations, an inspection head 300 may include only one instrument to measure a physical characteristic of a tabletop 130. In such cases, two or more inspection heads may be used at different times or simultaneously to obtain different physical characteristics of the tabletop 130 that can be provided to a user. The inspection head(s) may be positioned with the positioning apparatus, which is described further below.

A camera 310 of an inspection head 300 can comprise a CCD or CMOS imaging array, and can be configured on the inspection head to view features on a surface of the tabletop 130. For example, camera 310 may be oriented vertically or approximately vertically to view mounting features (e.g., threaded holes 215) located on a top surface of a tabletop 130. In some cases, the camera 310 can be mounted in other orientations and a mirror used to obtain images of mounting features. Such a mirror may be mounted on positioning apparatus that can change the orientation of the mirror automatically (e.g., using an actuator to rotate the mirror). The camera can obtain one or more electronic images of a region or portion of the tabletop's surface and features within the imaged portion, and output the images to a processor (e.g., a microprocessor or microcontroller of a controller or computing system) for analysis. The images may be output over a wired communication link 315 or a wireless communication link. By scanning the inspection head 300, images can be acquired for most or all of the top surface 211 of the tabletop 130 and of mounting/registration features formed thereon. In some implementations, images from other surfaces of the tabletop 130 may also be acquired by the camera 310.

In some implementations, a camera 310 of the inspection head 300 and positioning apparatus can be used to determine the precise location of features in a top surface 211 of a tabletop 130 and/or on other surfaces of the tabletop. Such features can include mounting features or other machined features. For example, one or more pixels of a camera's imaging array can be used as one or more reference marks to determine the locations of a mounting feature within an image. The positioning apparatus (described further in connection with FIG. 4A and FIG. 4B) can be used to move the camera laterally over the surface of the tabletop 130 by precise amounts so that a different mounting feature can be viewed with the camera 310. By keeping track of the amount of movement and/or location of the camera with sensors and the locations of mounting features within an image (with respect to one or more reference pixels), it is possible to determine a distance between mounting features with a high degree of precision over large areas. For example, the inspection system of the present embodiments can be capable of determining distances between features on a top surface 211 of a tabletop 130 with a precision between 0.1 mil and 0.5 mil, or between approximately those end values. In some implementations, the accuracy to which features are located may be detected to be between 0.1 mil and 0.5 mil, or between approximately those end values. Though, with some motion sensors (e.g., LIDAR sensors, interferometric sensors) higher precision and accuracy can be possible. In this manner, locations of features on a surface of the tabletop 130 can be determined and checked against specifications for the locations of the features to evaluate the accuracy and/or precision in location of one or more features on the surface.

In some embodiments, a controller of the inspection system is configured to read or receive information from a design file (e.g., a CAD file) or other data file to determine or obtain intended locations for features on a surface of the tabletop 130. The inspection system can then automatically position the inspection head 300 and camera 310 to view each feature and determine whether the feature is located at the intended or specified location. The inspection system can also determine how far a feature may be from its intended location (in the x-y plane) and record such differences in a data file. Such information may be provided with the tabletop to a user and/or to a customer who may purchase and use the tabletop.

The camera 310 may also be used to inspect each feature formed on a surface of the tabletop 130. For example, an image obtained for each feature can be compared against a reference image for the feature to determine whether a feature has any abnormality (e.g., unwanted burr, excess adhesive that may intrude into a hole 215, misaligned cup 220, missing cup 220, etc.). Any abnormalities can be recorded in a data log and/or presented to a system user (such as a manufacturing technician), so that the feature having an abnormality may be readily identified and modified to bring it into compliance with manufacturing specifications. According to some embodiments, an inspection head 300 may be equipped with marking apparatus. An example marking apparatus can include a non-permanent marking powder or liquid and dispensing tube 370 that can deliver the powder or liquid to the location of the non-compliant feature. The delivery may comprise spraying a small amount of the powder or liquid onto the surface of the tabletop 130 adjacent to the non-compliant feature.

According to some embodiments, a distance sensor 320 can comprise a light source (e.g., a laser or light-emitting diode) that shines light 322 on a surface (e.g., top surface 211) of the tabletop 130 and receives a signal that is indicative of a distance between the surface of the tabletop 120 and a location on the sensor 320. In some cases, the sensor may calculate a separation distance (in the z direction in the illustration) from the sensor to the tabletop surface using one or more characteristics of light reflected or scattered back from the surface. In some implementations, a separation distance can be calculated using parallax (e.g., lateral displacement of a return beam on a sensor array). In some cases, a distance may be calculated using time-domain reflectometry. Other distance-measuring techniques may be used additionally or alternatively (e.g., interferometry, LIDAR, stylus, strain-gauge, etc.) in some cases. According to some embodiments, an accuracy of a distance measurement can be between 0.5 mil (0.0005 inch) and 1.5 mils, or between approximately those end values, though higher accuracy may be obtained with some distance sensors.

By scanning the inspection head 300 over the tabletop 130, a record of separation distances from the distance sensor 320 to an inspected surface (e.g., the top surface 211) can be generated for multiple locations across the inspected surface of the tabletop 130. There may be tens to thousands of such measured separation distances for locations distributed across a surface. The measured separation distances can be processed to form a topographical map and/or other record that indicates a measure of flatness of the inspected surface. Flatness of the tabletops may then be specified based on the measurements, for example, to be less than 20 mils (±0.010") according to some embodiments, less than 10 mils (±0.005") according to some embodiments, and yet less than 4 mils (±0.002") in some cases, or approximately these values. Such maps and records can be local (e.g., in the vicinity of one or a few mounting features) or global (e.g., for large sections of the inspected surface or the entire inspected surface). Such maps and records can be provided to a user and/or customer as part of a specification document, for example.

In some embodiments, measured separation distances can be processed (e.g., fit to a plane) to determine a flatness of at least a portion of an inspected surface (e.g., for a small region around a mounting feature) or for a large region or all of the inspected surface. Additionally or alternatively, the separation distances can be processed to determine deviations from flatness for at least a portion of an inspected surface. In some cases, a "flatness map" may be produced that indicates at each measurement location an amount of deviation (positive or negative) from a perfectly flat reference plane. Flatness information may be stored in a file, and subsequently may be provided to a user and/or customer as part of a specification document. In some embodiments, the flatness information may be provided as a contour map or topographical map of each inspected surface of a tabletop. Data from the distance sensor 320 can be provided over a communication link to a controller and/or data processor.

In some implementations, one or more calibration tools may be used to determine variations or systematic errors in height (Z) of the inspection head 300 and distance sensor 320 as a function of position (X, Y) of the inspection head 300. For example, as the inspection head moves, its height may change due to imperfections and/or deflections in the apparatus used to hold and move the inspection head 300. According to some embodiments, a large-area calibration piece may be used, such as a granite slab with known flatness. A large-area calibration piece may provide a known reference plane or known surface from which systematic errors in height of the inspection head 300 can be determined. Once such systematic errors are determined, they can be recorded and corrected for when determining the flatness of a precision tabletop.

In some embodiments, a rotating laser or light-emitting diode may be used to produce a reference plane that can be used as a calibration plane or to register the location of the inspection head 300 while measurements are being made. A rotating laser can produce a thin optical reference plane by sweeping a laser beam over the tabletop 130. The optical reference plane may be essentially parallel to the tabletop 130, though it can be at one or more angles with respect to the tabletop 130 (e.g., rotations about the X and/or Y axes). If not parallel to the tabletop 130, the angle(s) can be detected when the measurement data is processed and the systematic error(s) produced by the angle(s) can be removed from the data to obtain a more accurate representation of the tabletop's flatness. An example of a rotating laser system is an ultra-precision leveling laser (model L-740) available from Hamar Laser of Danbury, Connecticut. A rotating laser may be mounted on a frame or structure that supports the inspection head 300, in some embodiments. In some cases, a rotating laser may be mounted on a stand, stable platform, or separate vibration-isolation platform near the tabletop 130 (e.g., within about 10 feet from the tabletop) at a location that experiences negligible movement during inspection of the tabletop 130.

An optical reference plane can be used to determine variations or systematic errors in height (Z) of the inspection head 300 and distance sensor 320 as a function of position (X, Y) of the inspection head 300, as described above in the manner that a granite slab is used. In some embodiments, an optical reference-plane sensor 325 can be placed on the inspection head 300 to sense the Z-height location of optical reference plane as the inspection head moves to various X, Y positions. In some cases, such a reference-plane sensor 325 can be a linear array of photodetectors extending along the Z direction that detect a Z position of the optical reference plane on the photodetectors. Such a calibration can be executed once before one or more measurements and stored in memory for later use in processing measured surface-height data from one or more tabletops 130.

Alternatively, an optical reference plane may be used in real time with each measurement made by the inspection head. For example, as the inspection head is moved to each X, Y location the system can detect the Z-height location of optical reference plane measured with the reference-plane sensor 325 and also measure a distance to the surface of the tabletop 130 with the distance sensor 320. These two values measured at each X, Y location can readily be processed to determine flatness of the tabletop 130. Since a distance between the reference-plane sensor 325 and the inspection head's distance sensor 320 is fixed, this distance need not be determined to evaluate tabletop flatness since it is constant for all X, Y locations.

According to some implementations, side and bottom surfaces of a tabletop 130 may be inspected with an inspection head. A bottom surface may be inspected, for example, by flipping the tabletop. Side surfaces may be inspected by using one or more mirrors to deflect an image and a distance-measuring beam by 90 degrees.

In some implementations, an inspection head 300 can include a perturbing device 330 that is configured to apply mechanical energy to the tabletop 130 and excite some motion of the tabletop. In some cases, the mechanical energy can be an impulse of mechanical energy that may be applied by an impact hammer. An impact hammer can comprise a striker 332 and apparatus that causes the striker 332 to strike or impact a surface (e.g., top surface 211 or bottom surface) of the tabletop 130 at a location below an inspection head 300. The striker 332 may be driven by electromechanical and/or pneumatic force, according to some embodiments. In some cases, when driven, the striker 332 may move rapidly to strike the inspected surface and quickly retract, imparting an impulse of mechanical energy into the tabletop 130. This impulse of energy can excite vibrational modes of the tabletop. In other cases, the striker 332 or perturbing device 330 may additionally or alternatively be adapted to function as a shaker and be contacted to a surface of the tabletop 130 and driven with an oscillating force to vibrate the tabletop 130 at one or more frequencies. In yet other embodiments, perturbing forces may be imparted to the tabletop 130 through supports that hold the tabletop during inspection of the tabletop or through a driven platform on which the tabletop 130 and its supports may be mounted. Such perturbing forces may be generated by one or more perturbing devices (such as actuators in active vibration-isolation systems) that act upon the tabletop or actuators acting on the platform. In some cases the actuators may be driven to simulate environmental conditions where the tabletop will be deployed.

A vibration sensor 340 can be deployed on a surface of the tabletop 130 and may be used to measure amounts of vibration and/or deflection, or signals indicative of amounts of vibration and/or deflection (such as acceleration signals) for a plurality of frequencies between 0 Hertz and 5000 Hertz, or between approximately those end values. The vibration and/or deflection can be produced in response to perturbing energy imparted to the tabletop, such as an impulse of energy imparted by the striker 332 and perturbing device 330. In some implementations, the measurements may be for a plurality of frequencies between 1 Hertz and 1000 Hertz, or between approximately those end values. In some implementations, the measurements may be for a plurality of frequencies between 1 Hertz and 100 Hertz, or between approximately those end values. The vibration measurements may be processed to produce compliance data, which can be provided to a user and/or customer. The compliance data can include a plot of displacement or acceleration of the surface at a measured location as a function of frequency. The displacement or acceleration may be normalized to an input displacement or acceleration provided by the perturbing device 330.

Compliance data can provide an indication of vibration-damping characteristics and stiffness of a region on a surface of the tabletop 130. According to some embodiments, one or more corner compliance measurements may be performed by striking a tabletop surface within eight inches of one or more of its corners and measuring vibration-damping and stiffness characteristics at approximately the same location as the impact force. In some embodiments, such compliance data and vibration-damping and stiffness measurements can be performed at additional or other locations on a tabletop (e.g., center, midpoints between center and edges, a selected pattern of locations, etc.) Such compliance data can provide a suitable industry reference for evaluating the performance of precision tabletops.

In some embodiments, the vibration sensor 340 can be separate from the inspection head 300. In some implementations, the vibration sensor 340 can be included with the inspection head 300, and may have a communication link with the inspection head and/or a system controller. In some cases, the vibration sensor 340 may provide measurement data directly to a controller and/or other data processor. According to some implementations, the vibration sensor 340 can be deployed and retrieved by the inspection head 300 at each measurement location. For example, the inspection head 300 may include a movable arm 352 that can connect to and release the vibration sensor 340 (e.g., using a magnetic, pneumatic, and/or mechanical grab-and-release mechanism). As such, vibration-damping and stiffness characteristics of the tabletop 130 can be measured for a plurality of locations over an inspected surface.

Figure 4A:
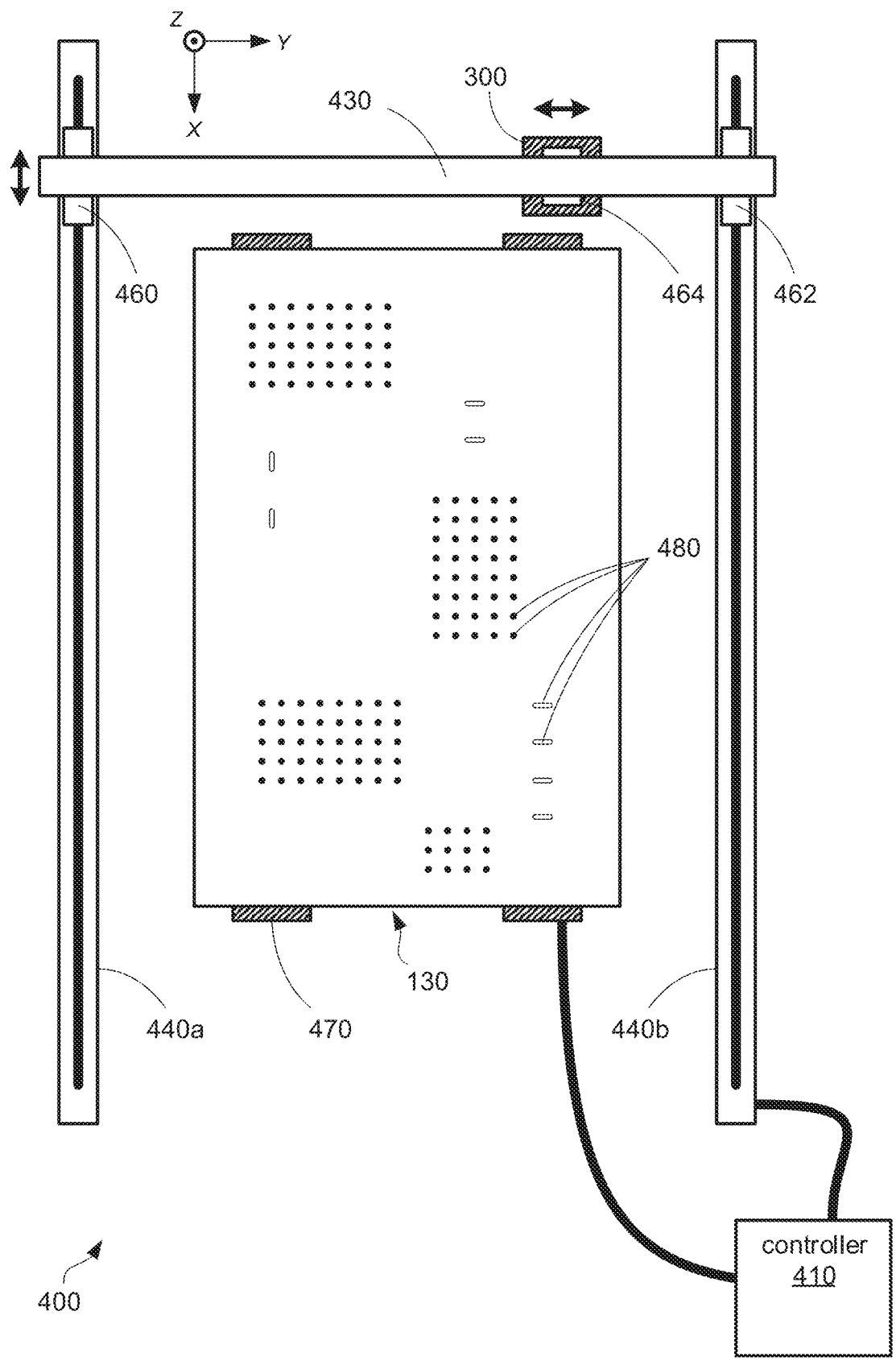
FIG. 4A depicts, in plan view, an example of additional structure of an inspection system that can be used to inspect a precision vibration-isolation tabletop, according to some embodiments.

An example of additional structure for an inspection system 400 is depicted in FIG. 4A. An inspection system 400 can include positioning apparatus for moving one or more inspection heads 300 in at least two or three degrees of freedom over a tabletop 130 to be inspected. For example, the inspection system 400 can include a first raceway 430 and positioning apparatus that provide for back-and-forth motion of the inspection head 300 in a first direction (e.g., the ±y direction). The inspection system 400 can include a second raceway 440*a* and positioning apparatus that provides for back-and-forth motion of the inspection head 300 in a second direction (e.g., the ±x direction). In some embodiments, multiple raceways 440*a*, 440*b* can be used to increase stability, accuracy, and reproducibility of motion and placement of the inspection head 300. According to some implementations, the raceways 430, 440*a*, 440*b* can be supported by a large steel frame or cage that surrounds, at least in part, the tabletop 130.

According to some embodiments, an inspection system 400 can further include a vibration-isolation system 470 having vibration-isolation supports that are located under a tabletop 130 to be inspected. For example, the tabletop 130 can be placed on the vibration-isolation system 470 for inspection of the tabletop 130, and provide a measure of vibration isolation during inspection. In some cases, the vibration-isolation supports are passive (e.g., pneumatic assemblies). In some cases, the vibration-isolation supports are active, such as the vibration-isolation assemblies described in connection with the vibration-isolation system of FIG. 1. According to some embodiments, vibration-isolation supports may be disabled during a flatness measurement of a surface of the tabletop 130. When the vibration-isolation supports are disabled, the tabletop 130 may no longer "float" relative to the inspection system 400 and inspection head 300. Instead, both the inspection system 400 and tabletop 130 may rest rigidly with respect to a base, or the tabletop 130 may rest rigidly on or with respect to a portion of the inspection system's frame.

The structure illustrated in FIG. 4A (and in FIG. 4B) can incorporate tabletops 130 of various sizes. An array of isolation supports may be located to support tabletops of various sizes. A selected portion of the isolation supports may be activated to support a tabletop being inspected depending on the size of the tabletop. In some cases, the isolation supports are movable prior to loading a tabletop onto the supports. The isolation supports activated and/or moved may emulate installment conditions at a user facility for a tabletop. Sizes of tabletops 130 that can be accommodated by the inspection system can range from 30 inches wide by 48 inches long to 59 inches wide and 192 inches in length, or approximately those end values. Tabletop thicknesses can range from 1 inch to 24 inches, or approximately those end values. In some implementations, longer tabletops may be inspected by testing one end portion, turning the table around, testing an opposing end portion, and meshing together measurement results.

In operation, the inspection head 300 can be moved automatically in each direction by one or more actuators 460, 462, 464 to one or a plurality of locations over the tabletop. At each location, inspection of a portion of the surface of the tabletop 130 can commence, and data can be recorded for one or more types of inspection (image, feature location, distance/flatness, vibration-damping, and stiffness) . In some implementations, a first actuator 464 may be used to position the inspection head 300 in a first direction (e.g., the ±y direction) along a first raceway 430, and two actuators 460, 462 may be used to position the first raceway 430 and inspection head 300 in a second direction (e.g., the ±x direction) along two raceways 440a, 440b. In some embodiments, the actuators may comprise stepper motors that are controlled by a system controller 410. A stepper motor may drive a worm gear or threaded rod, for example, that is used for positioning. An actuator may be located on or near an object that is moved (as depicted), or may be located near an end of a raceway. According to some implementations, positioning apparatus for the inspection head 300 can include sensors (e.g., optical encoders, distance sensors, or the like) that monitor and output precise position information of the inspection head 300.

The accuracy of the position sensors (if used) or the positioning apparatus (if accurate position sensors are not used) should be between a factor of two and a factor of 10 better than the accuracy to which distances between features on a tabletop are desired to be specified. For example, if it is desired to specify distances between features on the tabletop to within ±0.1 mil, then the accuracy of the position sensors (if used) or the positioning apparatus (if accurate position sensors are not used) should be between ±0.05 mil and ±0.01 mil, or between approximately those end values. By using accurate position sensors, lower quality (less accurate) positioning apparatus can be used. In some implementations, the position of the inspection head 300 may be determined using LIDAR with one or more LIDAR or optical distance-measuring devices mounted near the tabletop 130 (e.g., within 10 feet of the tabletop) and configured to detect the X, Y position of the inspection head 300.

Figure 4B:
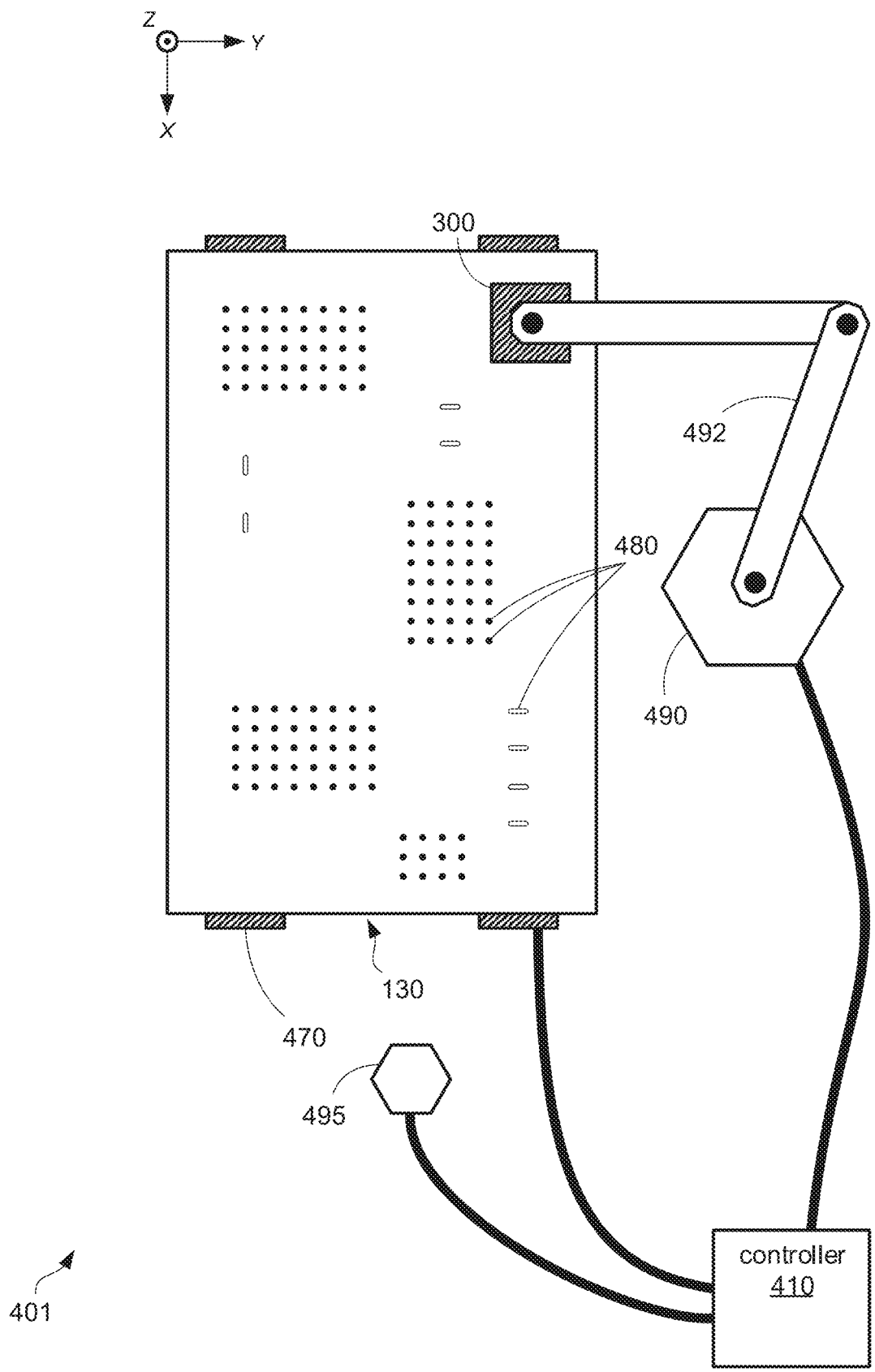
FIG. 4B depicts, in plan view, an example of additional structure of an inspection system that can be used to inspect a precision vibration-isolation tabletop, according to some embodiments.

Another embodiment of an inspection system 401 is illustrated in FIG. 4B. According to some embodiments, at least one robotic positioner 490 may be used to scan one or more inspection heads 300 over the surface of the tabletop 130. A robotic positioner 490 may include an articulating robotic arm 492 that can move an inspection head in at least the X and Y directions. According to some implementations, a robotic arm may additionally move an inspection head 300 in the Z direction, and may further rotate the inspection head about one or more rotational axes. In such an embodiment, the location of the inspection head may be determined with sensors (e.g., some combination of a rotary laser producing an optical reference plane, optical encoders, rotary encoders, LIDAR, optical distance sensors, etc.) mounted in or on the robotic positioner 490 and/or in one or more sensor towers 495 located near the tabletop 130 (e.g., within 10 feet of the tabletop). Such towers may also be used for the embodiment shown in FIG. 4A. The towers 495 may comprise a stand, stable platform, or vibration-isolation platform on which sensor equipment is mounted. A robotic positioner 490 and associated sensors may be in communication with the system controller 410, which can issue commands for controlling the robotic positioner and receive signals from the sensors to determine the location of the inspection head 300 and tabletop surface. When multiple inspection heads are used, each inspection head 300 may be positioned by a separate robotic positioner 490, which is in communication with the system controller 410.

According to some embodiments, a controller 410 can include at least one processor that provides overall control of the inspection system 400, 401. The controller 410 may be configured to provide programmable and automated motion of one or more inspection heads 300, control of a vibration-isolation system 470 used to support a precision tabletop 130 during inspection, control of components on the inspection head(s), and acquisition of data from the inspection head(s). Acquired data can include video images, distance measurements (from both the inspection head and positioning apparatus), and data from a vibration sensor 340 (such as accelerometer data).

In some implementations, a controller 410 can include computing hardware and software that allows for reading, analyzing, and displaying a computer-aided design (CAD) file, such as a CAD file that may have been created during design of the tabletop 130. The CAD file may include the locations of mounting features 480 on one or more surfaces of a tabletop. The controller 410 can be configured to read or derive the locations of mounting features 480 from the CAD file or other data file and automatically position the inspection head 300 at each location for inspection. The controller 410 can be further configured to process video images acquired by the camera 310 to determine whether there are any discrepancies in a mounting feature, as described above.

Any data collected by the inspection system 400, 401 can be used to create an inspection report. The report may include information relevant to tabletop flatness, location of mounting features, accuracy of mounting features, and results of vibration-damping and stiffness tests. The report may include an identifier for the tabletop (e.g., model and/or serial number) so that performance of a tabletop can be traced. The report may be rendered in electronic and/or paper form and provided to a user and/or customer.

Figure 5:
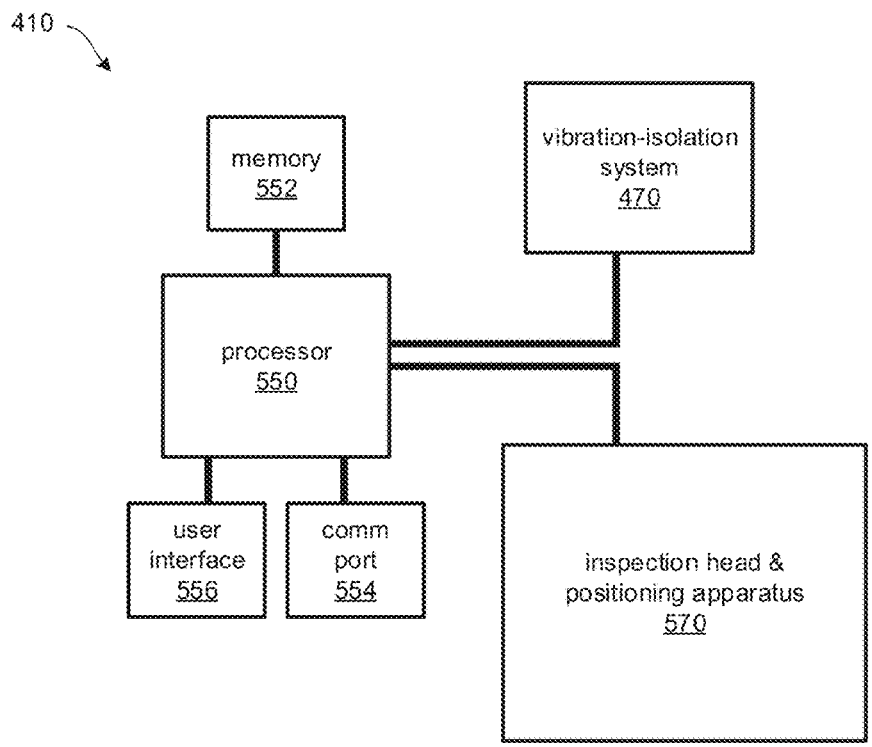
FIG. 5 depicts further aspects of a controller, according to some implementations.

FIG. 5 depicts components of a controller 410 that may be included in an inspection system, in some embodiments. A controller 410 can include memory 552, at least one processor 550, and a user interface 556. The controller 410 can further include, in some cases, a communication port 554. The controller 410 may be in communication with the inspection head 300 and positioning apparatus 570 of an inspection system 400, 401. According to some implementations, the controller 410 can be in communication with a vibration-isolation system 470 that is used to support a tabletop 130 for inspection.

The processor 550 may comprise one or more data processing devices (e.g., any one or combination of a microprocessor, microcontroller, a digital signal processor (DSP), an application specific integrated circuit (ASIC), and at least one field-programmable gate array (FPGA)) that is adapted with machine-readable instructions or code to execute functionality and issue control signals associated with data acquisition and operation of one or more of: the inspection head 300, positioning apparatus 570, and vibration-isolation system 470. There may be more than one processor in the system in some embodiments, e.g., dual core or multi-core processors, or one or more processors communicating with at least one controlling processor. In some embodiments, a processor 550 for the system may comprise a dedicated microcontroller, microprocessor, FPGA, or ASIC.

Memory 552 can include one or more data storage devices that employ electronic, optical, and/or magnetic technology for storing digital and/or analog data. Examples of memory can include, but are not limited to, volatile and nonvolatile, manufactured storage media, removable and non-removable manufactured storage media. By way of example, and not limitation, memory 552 may comprise information such as computer-readable instructions, data structures, program modules or other data. memory 552 can include, but is not limited to, RAM, ROM, EEPROM, flash memory or other memory-device technology, CD-ROM, digital versatile disks (DVD) or other optical disk storage, magnetic cassettes, magnetic tape, magnetic disk storage or other magnetic storage devices, or any other manufactured data-storage device which can be used to store the desired information and which can accessed by processor 550.

In some embodiments, memory 552 may include computer storage media in the form of volatile and/or nonvolatile memory such as read only memory (ROM) and random access memory (RAM). A basic input/output system (BIOS), containing the basic routines that help to transfer information between elements within processor 550, such as during start-up, may be stored in ROM, for example. RAM may contain data and/or program modules that are immediately accessible to and/or presently being operated on by the processor 550.

According to some embodiments, the controller 410 may include other removable/non-removable, volatile/nonvolatile machine-readable media. Other machine-readable media can include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other or additional removable/non-removable, volatile/nonvolatile machine-readable media that can be used in a controller 410 include, but are not limited to, magnetic tape cassettes, flash memory cards, digital versatile disks, digital video tape, solid state RAM, solid state ROM, and the like. According to some implementations, a hard disk drive may be connected to a system bus through a non-removable memory interface, and magnetic disk drive and optical disk drive may be connected to the system bus by a removable memory interface.

A user may interact with and operate a controller 410 by entering commands and information into the controller 410 through one or more user interfaces 556 such as a keyboard and pointing device, commonly referred to as a mouse, trackball or touch pad. Other or additional interface devices may include a microphone, joystick, game pad, satellite dish, scanner, touchscreen, buttons, knobs, dials, panel indicators, liquid-crystal displays, or the like. These and other input devices may be connected to the processor via a system bus, but may be connected by other interface and bus structures, such as a parallel port, game port or a universal serial bus (USB). A user interface can include a display or monitor or other type of display device which can be connected to the system bus via an interface, such as a video interface.

According to some implementations, the controller 410 may operate in a networked environment using logical connections and a communication port 554 to one or more remote devices, such as a remote computer. The remote computer may be a personal computer, a server, a router, a network PC, a peer device or other common network node, and may include many or all of the elements described above relative to the controller 410. The communication port 554 may comprise a modem, Ethernet board, or other networking device that enables communication over a local area network (LAN) 671 and a wide area network (WAN) 673, and/or other networks. Such networking environments may be commonplace in offices, manufacturing facilities, enterprise-wide computer networks, intranets, and the Internet. Network connections may be wired, optical fiber based, or wireless.

When used in a LAN networking environment, the controller 410 may be connected to the LAN through a network interface or adapter. When used in a WAN networking environment, the controller 410 may include a modem or other means for establishing communications over the WAN, such as the Internet. A modem, which may be internal or external, may be connected to the system bus or other appropriate mechanism. In a networked environment, program modules, or portions thereof, may be stored in a remote memory storage device.

In some embodiments, at least some of the acts described above and associated with inspection of a precision tabletop 130 may be implemented as machine-readable instructions that can be loaded onto a processor 550 of the system controller 410. The machine-readable instructions may be stored as software on manufactured computer readable medium, examples of which are described above. In some implementations, the machine-readable instructions may be embodied, at least in part, as firmware on an instrument.

Figure 6:
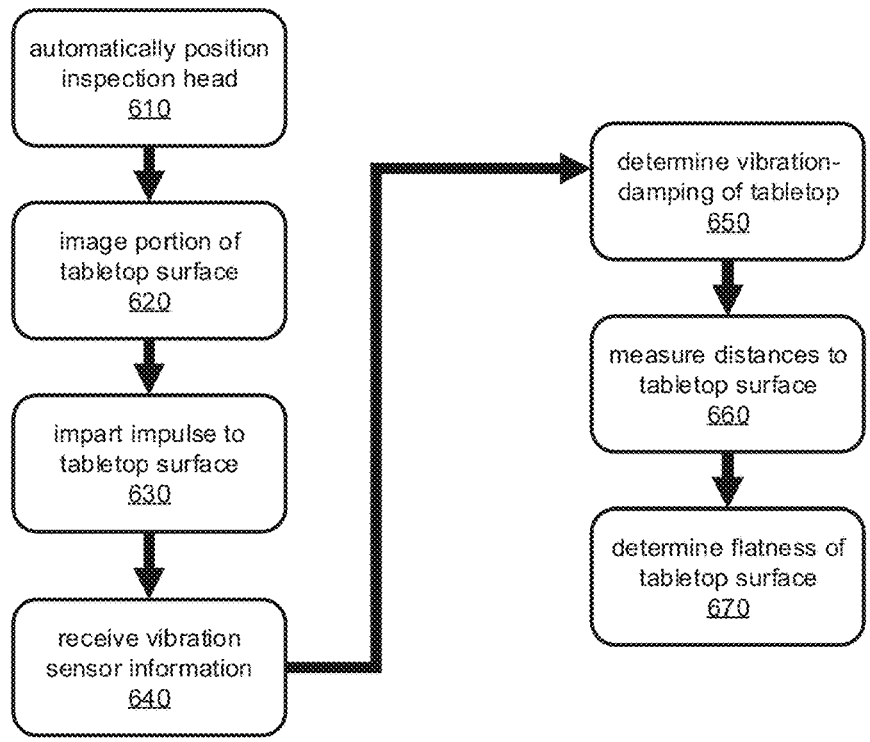
FIG. 6 illustrates acts that may be included in methods of inspecting a vibration-isolation tabletop.

An example of acts associated with methods of inspecting a tabletop 130 are illustrated with the flow chart of FIG. 6. Such methods may include acts of automatically positioning (act 610) an inspection head at a first location over a precision tabletop and obtaining an image (act 620) of a portion of a surface of the precision tabletop. Example methods may further include automatically imparting perturbing energy, such an impulse, (act 630) to a surface of the tabletop with a perturbing device and receiving sensor information (act 640) indicating an effect of the perturbing energy on the surface of the tabletop. The received information from the sensor can be used to determine (act 650) a vibration-damping response of the tabletop 130. Further acts of such methods can include measuring (act 660) a plurality of distances to the surface at a plurality of locations over the precision tabletop, and determining (act 670) a flatness of the precision tabletop based on the plurality of distances. In some implementations, the flatness may be determined with respect to an optical reference plane.

The technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Additionally, a method may include more acts than those illustrated, in some embodiments, and fewer acts than those illustrated in other embodiments.

Various configurations and methods relating to the disclosed inspection system may be possible with various combinations of features. Examples of such configurations are set forth in the numbered list below. The listed configurations can include features of the inspection systems 400, 401 and inspection head 300 described above.

(1) A vibration-isolation inspection system comprising an inspection head having an imaging array and a perturbing device, such as an impact hammer, that imparts mechanical energy to vibration-isolation equipment, and a system controller configured to control motion of the inspection head.

(2) The vibration-isolation inspection system of configuration (1), wherein the inspection head further includes a distance sensor configured to determine a distance between a surface of a precision tabletop and a location on the inspection head.

(3) The vibration-isolation inspection system of configuration (1) or (2), wherein the inspection head further includes marking apparatus arranged to impose a mark on a surface of a precision tabletop.

(4) The vibration-isolation inspection system of any one of configurations (1) through (3), further comprising positioning apparatus configured to position the inspection head at a plurality of locations over a precision tabletop.

(5) The vibration-isolation inspection system of configuration (4), wherein the positioning apparatus comprises a robotic arm.

(6) The vibration-isolation inspection system of any one of configurations (1) through (5), further comprising apparatus to produce an optical reference plane over a surface of a precision tabletop.

(7) The vibration-isolation inspection system of any one of configurations (1) through (6), wherein the system controller is configured to read a design file and determine locations of features machined on a surface of a precision tabletop to be inspected.

(8) The vibration-isolation inspection system of any one of configurations (1) through (7), wherein the system controller is configured to produce data indicating a flatness of a top surface of a precision tabletop.

(9) The vibration-isolation inspection system of any one of configurations (1) through (3), wherein the system controller is configured to produce data indicating vibration-damping characteristics at a plurality of locations on a top surface of a precision tabletop.

Example combinations of acts for methods that may be practiced with the inspection system and inspection head of the disclosed embodiments and above configurations are listed below.

(10) A method of inspecting a precision tabletop, the method comprising: automatically positioning an inspection head at a first location over a precision tabletop; obtaining an image of a portion of a surface of the precision tabletop; automatically imparting an impulse to the surface with an impact hammer; and receiving sensor information indicating an effect of the impulse on the surface.

(11) The method of (10), further comprising: measuring a plurality of distances to the surface from the inspection head at a plurality of locations over the precision tabletop; and determining a flatness of the surface based on the plurality of distances.

(12) The method of (11), further comprising providing information relating to the flatness of the surface to a user.

(13) The method of any one of (10) through (12), further comprising, at a plurality of locations: automatically imparting an impulse to the surface with the impact hammer; receiving sensor information indicating an effect of the impulse on the surface; and providing information relating to vibration-damping characteristics at the plurality of locations to a user.

(14) The method of any one of (10) through (13), further comprising deploying a vibration sensor from the inspection head onto the surface.

(15) The method of any one of (10) through (14), further comprising imparting a mark on the portion of the surface based on an image of a mounting feature in the portion of the surface.

(16) The method of any one of (10) through (15), further comprising reading a design file to determine a location at which to position the inspection head, wherein the design file includes information about mounting features formed in the surface.

(17) The method of any one of (10) through (16), further comprising determining an accuracy of a location of a mounting feature in the surface based on the image.

(18) The method of (17), further comprising providing information relating to the accuracy of the location of one or more mounting features in the surface to a user.

(19) A method of inspecting a precision tabletop, the method comprising: automatically positioning an inspection head at a plurality of locations over a precision tabletop; obtaining information about physical characteristics of the precision tabletop at the plurality of locations; and providing the information to a user of the precision tabletop.

(20) The method of (19), wherein the physical characteristics include flatness of a surface of the precision tabletop.

(21) The method of (19) or (20), wherein the physical characteristics include vibration-damping characteristics of a surface of the precision tabletop.

(22) The method of any one of (19) through (21), further comprising imparting an impulse to a surface of the precision tabletop at the plurality of locations.

(23) The method of any one of (19) through (22), further comprising measuring a distance between a location on a surface of the precision tabletop and the inspection head at the plurality of locations.

(24) The method of (23), further comprising referencing the measured distance to an optical reference plane.

Unless stated otherwise, the terms "approximately" and "about" are used to mean within ±20% of a target dimension in some embodiments, within ±10% of a target dimension in some embodiments, within ±5% of a target dimension in some embodiments, and yet within ±2% of a target dimension in some embodiments. The terms "approximately" and "about" can include the target dimension. The term "essentially" is used to mean within ±3% of a target dimension.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting.

What is claimed is:

1. A vibration-isolation inspection system comprising:
an inspection head having an imaging array and a perturbing device that imparts mechanical energy to a precision vibration-isolation tabletop; and
a system controller configured to control motion of the inspection head with respect to a surface of the precision vibration-isolation tabletop, wherein the system controller is configured to produce data indicating vibration-damping characteristics at a plurality of locations on the surface of the precision vibration-isolation tabletop.

2. The vibration-isolation inspection system of claim 1, wherein the inspection head further includes a distance sensor configured to determine a distance between the surface of the precision vibration-isolation tabletop and a location on the inspection head.

3. The vibration-isolation inspection system of claim 1, wherein the inspection head further includes marking apparatus arranged to impose a mark on a surface of the precision vibration-isolation tabletop.

4. The vibration-isolation inspection system of claim 1, further comprising positioning apparatus configured to position the inspection head at a plurality of locations over the precision vibration-isolation tabletop.

5. The vibration-isolation inspection system of claim 4, wherein the positioning apparatus comprises a robotic arm.

6. The vibration-isolation inspection system of claim 1, further comprising apparatus to produce an optical reference plane over the surface of the precision vibration-isolation tabletop.

7. The vibration-isolation inspection system of claim 1, wherein the system controller is configured to read a design file and determine locations of features machined on the surface of the precision vibration-isolation tabletop to be inspected.

8. The vibration-isolation inspection system of claim 1, wherein the system controller is configured to produce data indicating a flatness of the surface of the precision vibration-isolation tabletop.

9. The vibration-isolation inspection system of claim 1, wherein the system controller is configured to generate compliance data indicating a displacement of the surface as a function of frequency for at least a range of frequencies below 100 Hz for each location at which the perturbing device imparts the mechanical energy to the precision vibration-isolation tabletop.

10. A method of inspecting a precision vibration-isolation tabletop, the method comprising:
automatically positioning an inspection head at a first location over the precision vibration-isolation tabletop;
obtaining an image of a portion of a surface of the precision vibration-isolation tabletop;
automatically imparting an impulse to the surface with an impact hammer;
receiving sensor information indicating an effect of the impulse on the surface;
automatically positioning the inspection head at a plurality of locations over the precision vibration-isolation tabletop;
measuring a plurality of distances to the surface from the inspection head at the plurality of locations over the precision vibration-isolation tabletop; and
determining a flatness of the surface based on the plurality of distances.

11. The method of claim 10, further comprising:
generating, from the sensor information, compliance data indicating a displacement of the surface as a function of frequency for at least a range of frequencies below 100 Hz for the first location.

12. The method of claim 10, further comprising providing information relating to the flatness of the surface to a user.

13. The method of claim 10, further comprising, at a plurality of locations:
automatically imparting an impulse to the surface with the impact hammer;
receiving sensor information indicating an effect of the impulse on the surface; and
providing information relating to vibration-damping characteristics at the plurality of locations to a user.

14. The method of claim 10, further comprising deploying a vibration sensor from the inspection head onto the surface.

15. The method of claim 10, further comprising imparting a mark on the portion of the surface based on an image of a mounting feature in the portion of the surface.

16. The method of claim 10, further comprising reading a design file to determine a location at which to position the inspection head, wherein the design file includes information about mounting features formed in the surface.

17. The method of claim 10, further comprising determining an accuracy of a location of a mounting feature in the surface based on the image.

18. The method of claim 17, further comprising providing information relating to the accuracy of the location of one or more mounting features in the surface to a user.

19. A method of inspecting a precision vibration-isolation tabletop, the method comprising:
automatically positioning an inspection head at a plurality of locations over the precision vibration-isolation tabletop;
obtaining information about physical characteristics of the precision vibration-isolation tabletop at the plurality of locations;
providing the information to a user of the precision vibration-isolation tabletop measuring a distance between a location on a surface of the precision vibration-isolation tabletop and the inspection head at the plurality of locations; and
referencing the measured distance to an optical reference plane.

20. The method of claim 19, wherein the physical characteristics include flatness of the surface of the precision vibration-isolation tabletop.

21. The method of claim 19, wherein the physical characteristics include vibration-damping characteristics of the precision vibration-isolation tabletop.

22. The method of claim 19, further comprising imparting an impulse to the surface of the precision vibration-isolation tabletop at the plurality of locations.

23. The method of claim 19, further comprising:
imparting an impulse to the surface of the precision vibration-isolation tabletop at a first location;
receiving sensor information indicating an effect of the impulse on the surface; and
generating, from the sensor information, compliance data indicating a displacement of the surface as a function of frequency for at least a range of frequencies below 100 Hz for the first location.

* * * * *